United States Patent [19]
Rowe et al.

[11] Patent Number: 4,710,433
[45] Date of Patent: Dec. 1, 1987

[54] TRANSPARENT CONDUCTIVE WINDOWS, COATINGS, AND METHOD OF MANUFACTURE

[75] Inventors: James M. Rowe, Torrance; Rudolph W. Modster, Los Angeles, both of Calif.

[73] Assignee: Northrop Corporation, Hawthorne, Calif.

[21] Appl. No.: 883,897

[22] Filed: Jul. 9, 1986

[51] Int. Cl.$^4$ .............................................. B21D 39/00
[52] U.S. Cl. ................................... 428/623; 428/629; 428/630; 428/632; 428/640; 428/641; 428/652; 428/654; 428/658; 428/672; 428/673; 428/428; 428/433; 428/469
[58] Field of Search ............... 428/623, 629, 630, 632, 428/640, 641, 652, 654, 658, 672, 673, 428, 433, 469, 34

[56] References Cited

U.S. PATENT DOCUMENTS

| | | | |
|---|---|---|---|
| 2,628,927 | 2/1953 | Colbert et al. | 428/336 |
| 3,039,896 | 6/1962 | Van Cakenberghe et al. | 428/204 |
| 3,935,458 | 1/1976 | Peters | 250/338 |
| 4,153,518 | 5/1979 | Holmes et al. | 428/630 |
| 4,204,374 | 5/1980 | Olson | 52/208 |
| 4,306,110 | 12/1981 | Nelson et al. | 178/18 |
| 4,320,169 | 3/1982 | Yatabe et al. | 428/672 |
| 4,327,967 | 5/1982 | Groth | 428/672 |
| 4,563,400 | 1/1986 | Criss et al. | 428/630 |

FOREIGN PATENT DOCUMENTS 2126256  3/1984  United Kingdom ............... 428/469

OTHER PUBLICATIONS

A. E. Ennos, British Journal of Applied Physics, vol. 8, Mar. 1957, "Highly-Conducting Gold Films Prepared by Vacuum Evaporation", pp. 113-117.

P. W. Baumeister, Applied Optics, vol. 8, No. 2, Feb. 1969, "Radiant Power Flow and Absorptance in Thin Films", pp. 423-436.

R. Rosenberg, M. J. Sullivan, J. K. Howard, IBM System Products Division, East Fishkill, N.Y., "Effect of Thin Film Interactions on Silicon Device Technology," pp. 13-55.

Georg Haas, Academic Press, vol. 9, 1977, "Physics of Thin Films", pp. 1-71.

*Primary Examiner*—L. Dewayne Rutledge
*Assistant Examiner*—George Wyszomierski
*Attorney, Agent, or Firm*—Terry J. Anderson; Robert B. Block

[57] ABSTRACT

Methods are disclosed for the manufacture of optical conductive transparent windows and coatings having high transparency over a wide bandwidth combined with a large acceptance angle of incidence. Particulars for making windows and coatings with gold films of high transparency and low sheet resistance using specified nucleating and barrier layers are given. Examples include windows and coatings constructed for operation in the infrared and ultraviolet.

29 Claims, 9 Drawing Figures

TRANSPARENT CONDUCTIVE WINDOWS, COATINGS, AND METHOD OF MANUFACTURE

BACKGROUND OF THE INVENTION

This invention relates to transparent, electrically conductive coatings, to windows made with such coatings, and to methods for their manufacture. More particularly, the invention relates to such coatings, windows, and methods for use in making the infrared (IR) and ultraviolet (UV) conductive windows.

Transparent conductive coatings and windows have application in a number of devices including resistance heating windows, electromagnetic interference (EMI) shielding, antistatic windows, and transparent electrodes. When used as infrared or UV transparent windows, it is desired that a substantial bandwidth of the energy pass with high transmittance while maintaining a low sheet resistance so as to block radiation which is outside the bandpass of the window.

In general, this invention provides spatially continuous conductive window or coating having an extended area and exhibiting low electrical resistivity and high optical transmission. The invention significantly enhances the overall responsivity of IR or UV detectors by providing electrical background radiation immunity without significant decrease in light intensity incident on the detectors protected by the window. The windows and coatings that are the subject of this invention must have a significant optical transmission bandwidth in order to be useful.

Induced transmission electrically conductive, transparent coatings and windows can be produced on a suitable substrate by sandwiching a thin metallic layer between dielectric thin films laid up on the substrate. While, low electrical resistivities have been achieved in certain prior art devices the optical transmission losses have not been acceptable. In those induced transmission configurations utilizing thin metallic films, low electrical resistivities and significant optical transmission have only been achieved for a narrow transmission bandwidth. The conductive layers used in prior art include noble metals and metal oxides Designs based on degenerate semiconductor materials, such as indium-tin-oxide (ITO), are applicable only to limited wavelength regions. Low electrical resistivity and high optical transmission have not been achieved with ITO for the infrared wavelengths.

While prior art coatings have been developed for the visible-to-near-infrared ($\sim 1$ $\mu$m) region, low electrical resistivity and high optical transmittance window criteria as set forth in this invention have not existed for mid-wavelength infrared applications (3–6 $\mu$m). There is, therefore, a need for new optically transparent, conductive windows and coatings and methods for their manufacture.

OBJECTS AND SUMMARY OF THE INVENTION

In general, it is an object of the present invention to provide novel transparent conductive windows and coatings, together with methods for their manufacture.

It is a further object to provide a window, coating, and method of the above character having enhanced transmission, a significant bandwidth, and utility over a wide range of incident light angles.

It is a further object of the invention to provide a window, coating, and method of the above character which will withstand use in aircraft and military applications.

It is a further object of the invention to find a window, coating and method of the above character which can be designed for operation in the mid-infrared or ultraviolet bands.

Another object of the invention is to provide a window coating and method of the above character for use in the 3–5 $\mu$m and 8–12 $\mu$m infrared bands and which possess an electrical sheet resistance of about 5–10 ohms/sq. or less and optical transmittance as high as approximately 80% averaged over the band.

A further object of the invention is to provide a window coating and method of the above character which provides for enhanced operation for radiation received from normal incidence to a 70° angle of incidence.

The approach of the present invention uses induced transmission through very thin (100 angstroms) conductive metal layer by means of incorporating the metal layer between dielectric matching layers. The conductive metal layer will always absorb some light. Free carrier absorption, bound electronic transitions, and vibrational transitions for the material constituting the conductive layer as well impurities and defects will contribute to the optical absorption. Electronic transitions are important in the ultraviolet. Free carrier absorption is more important in the infrared and cannot be avoided since charge carriers are necessary for electrical conduction.

In induced transmission the higher absorption of the metal layer is offset by its extreme thinness which allows a dielectric interference stack to be designed which will place a minimum of the standing wave electric field at the location of the metal layer with the result that the absorption is minimized and fairly high transmission percentages can be achieved. Matching stacks will, in general, only perform at one optical wavelength and at a certain angle of incidence. However, the design of the impedance matching stacks can be selected so as to optimize bandwidth and reduce sensitivity to changes in the incident angle of radiation.

In general, the present invention employs a self supporting substrate on which is deposited, in order, a first impedance matching stack of dielectric layers, a diffusion barrier layer, a nucleating layer, a metal conductive film layer, a second diffusion barrier layer, and finally an anti-reflection matching stack of dielectric layers. The metal layer provides the required electrical conduction properties while the dielectric layers enchance the transmission and provide protection for the metal layer.

A preferred embodiment of an induced transmission electrically conductive optically transparent window and coating constructed in accordance with the present invention requires the substrate to be transparent in the wavelength region of operation. The first matching stack consisting of one or more transparent dielectric thin films having different indices of refraction deposited on the substrate to match the optical impedance of the metal layer to the transparent substrate. Extremely thin barrier layer and nucleating layers are then deposited on the matching stack after which the conductive metal layer is deposited. Thereafter another barrier layer is deposited on the conductive metal layer and an anti-reflection stack of a plurality of transparent dielectric films is deposited thereover to match the optical impedance of the conductive film to air. The optical and electrical properties of the conductive metal layer are of critical importance. Successful fabrication of transparent conductive coatings requires that the thickness of the metal film be uniform within ±5% and that its refractive index properties be substantially the same as the bulk form of the material. It is necessary to use particular nucleating materials, and process specifications so that the conductive layer is deposited as a continuous film without aggregation. This has been achieved using very thin, i.e. less than 10 A nucleating and barrier layers, between the conductive layer and the dielectric layer(s) making up the first matching stack and a very thin barrier layer between the conductive layer and the dielectric layers making up the antireflection stack. (The abbreviation, A, will be used herein for Angstroms.)

DESCRIPTION OF THE PREFERRED EMBODIMENTS

Figure 1:
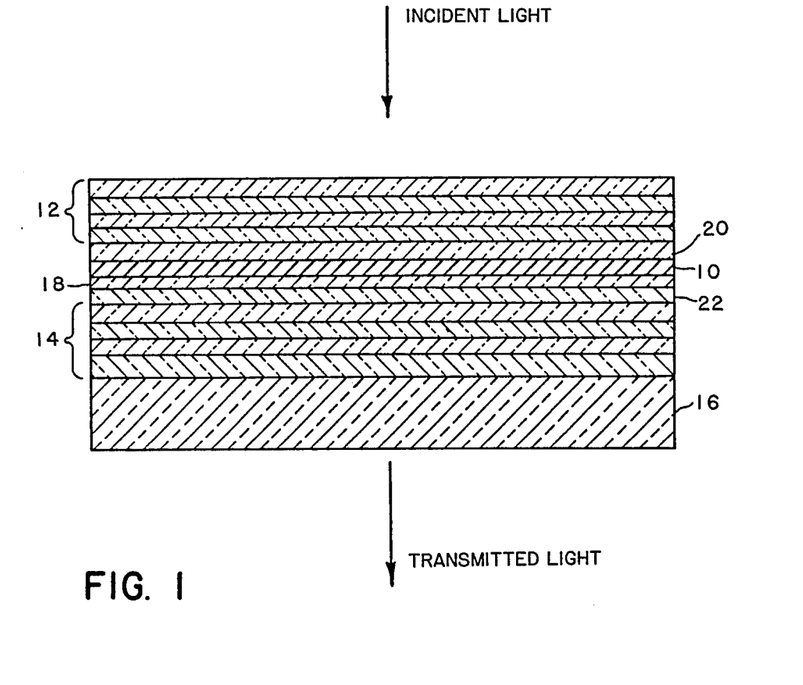
FIG. 1 is a cross-sectional view in elevation of an electrically conductive optically transparent window constructed in accordance with the present invention showing an ultra-thin metal layer sandwiched between impedance matching dielectric stacks on a substrate.

Referring to FIG. 1, this is shown as an electrically conductive optically transparent window having low electrical resistivity, high optical transmission, and large pass-bandwidth obtained by using a metallic film 10 made out of highly conductive material, namely gold, placed between impedance matching dielectric layers 12, 14 laid up on a transparent substrate 16. It is essential that the ultrathin metallic film have uniform thickness and properties that maximize optical transmission for a given electrical sheet resistance. While the optical and electrical properties of ultrathin metal films have heretofore been found to be inferior when compared to their bulk form values, the method of the present invention is capable of coming quite close to the values of the bulk form.

The window and coating design of the present invention includes a nucleating layer 18 on which the metal film layer is deposited. The purpose of the nucleating layer is to provide coalescence at the earliest stage of metal film formation thereby ensuring a smooth and continuous layer. This is especially important for the attainment of low electrical resistivities while preserving high optical transmission.

The metal layer is isolated above and below by barrier layers 20,22. The purpose of the barrier layers is to prevent the diffusion of the metal and dielectric materials into one another; this can lead to compound material formation which significantly degrades the electrical and optical properties of the coating and window.

A useful formalism for dealin9 with any layer exhibitin9 absorbance is that of potential transmittance. The potential transmittance $T_p$ of a layer is the fraction of net incident flux which emerges from the layer. $T_p$ represents not the actual transmittance but what the transmittance would be if no light were reflected from the coating. Obviously $0 \geq T_p \geq 1$ for passive coating materials. The maximum potential transmittance $T_{max}$ is the value of $T_p$ obtained for perfect impedance matching on both sides of the absorbing layer. It is a function only of the wavelength w, thickness t, and optical constants n and k, of the absorbing layer.

The maximum potential transmittance, $T_{max}$ through a metal layer is given approximately by $$T_{max} \sim 1 - 2\frac{n}{k}\left(\frac{2\pi}{cR_{op}}\right)^2 \tag{1}$$

where n,k refers to the index of refraction and absorption index, c is the speed of light and $R_{op}$ denotes the effective optical sheet resistance. It is obvious that for a given desired value of the sheet resistance, the optical transmittance may be improved by increasing the k/n ratio. In order to attain high transmittance, special nucleating and barrier layers and additional steps in processing the metal film are employed in accordance with the present invention. These additional steps include elimination of organic contaminants and water vapor from the deposition environment, continuous vapor disposition of the various layers at high vacuum (~$10^{-6}$ Torr) without breaking vacuum, control of substrate temperature and deposition rate, and optional annealing of the metal film at a temperature within the range between 200° and 300° C. Care must be taken not to exceed a certain time-temperature limit during annealing to avoid agglomeration of the metal film which could significantly degrade the properties of the coating.

Figure 2:
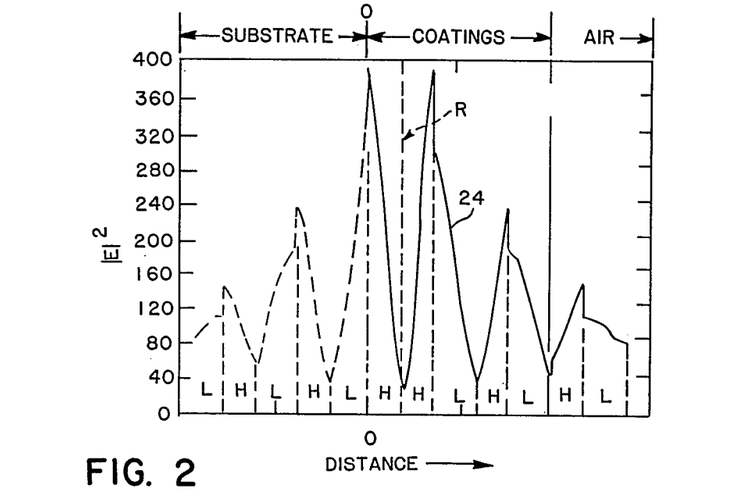
FIG. 2 is a graph showing the absolute electric field intensity distribution of optical radiation within a stack of dielectric films of high (H) and low (L) refractive index and showing the existence of a region R with low electric field values.

A metal film prepared by the method of this invention has low inherent optical absorption so that loss of optical transmission through such metal films will be largely due to reflection by the impedance mismatch with adjacent media. Much of the optical transmission can be recovered by the use of appropriate dielectric impedance matching layers on both sides of the metal film. Ideal impedance matching only occurs at the design center wavelength of the dielectric layers. This is primarily due to the dispersion in the effective optical constants of the dielectric matching layers. The desired high optical transmittance (averaged over the passbandwidth of the coating) can, however, still be achieved because of the extreme thinness of the metal film. FIG. 2 shows the standing electric wave field 24 distribution in a multi-layer dielectric stack (the designation L and H refer to low and high refractive index materials). It can be seen from FIG. 2 that a minimum of the standing electric field exists at region R between the two high refractive index films. The placement of the highly conducting metal film at this location minimizes the absorption loss and provides a highly conductive but transparent metal layer and coating.

The preferred technique for deposition of optical coatings in accordance with this invention is physical vapor deposition. The coating material is vaporized in vacuum by resistance or electron beam heating and the vapor condenses on the substrate to form the film. Evaporation is preferably done in high vacuum, typically about $10^{-6}$ Torr, although reactive gases may be bled into the chamber to maintain stoichiometry in oxide materials or to do reactive evaporation. Rate of deposition and film thickness are continuously monitored by crystal microbalance or optical monitoring. The substrate temperature is controlled and may be heated or cooled. Excellent coating uniformity can be obtained with planetary motion of the substrates and the process is scalable to coating of substrates several feet in diameter. Monitoring of the resistance of metal films during deposition is done by measuring the resistance of a strip of film defined by a mask or by the four-point probe method.

Because the metal films are so thin it is necessary to use special techniques to produce a continuous layer Otherwise the resistivity is many times more than that of the bulk metal. Careful consideration must be given to the initial stages of film growth. Film growth begins at nucleation sites which grow to form islands that then coalesce into a continuous film. The islands can exhibit surprising mobility on the substrate surface and the coalescence stage is referred to as "liquid-like" coalescence. This behavior is understood to be due to the small size of the islands (about 5 nm) which greatly enhances the effects of surface tension and electrostatic charge. For the present application it is desirable to have a high density of nucleation sites and that the growing islands not agglomerate into large, widely separated islands prior to coalescence. Even films which are already continuous can undergo a large increase in resistivity if agglomeration takes place.

A nucleating layer is used to promote coalescence in the thin evaporated metal film. The use of a nucleation promoting layer beneath the metal is effective in producing thin, low resistance gold films.

For the example given herein, gold is chosen as the conductive layer and aluminum as the -ucleating layer Diffusion barriers are $Al_2O_3$. Preliminary screening experiments have been performed using glass microscope slides as substrates. A calibrated crystal monitor was used to measure deposition rate and thickness during deposition. The monitor was calibrated by comparison with measurements made using multiple beam interferometry and a stylus profilometer. Film thickness was kept constant at 10 nm. Samples were measured by the four-poi probe technique, and by defining a rectangular area of the film with copper strips at the ends and measuring resistance with an ohm meter. The nucleating layer was an aluminum film deposited 5 A thick.

Metal layer deposition is done at a moderate rate ($<1$ nm/s) onto room temperature or cooled substrates. Specifically, the gold film was vapor deposited from a resistance heated tungsten boat on a substrate held at 9° C. at a pressure of $1.5\times10^{-6}$ Torr or lens. The gold was 99.999% pure. The deposition rate was about 4 A/sec Oxygen is normally bled into the chamber when depositing aluminum oxide in order to maintain stoichiometry. However, in the present application, use of an oxygen bleed during gold deposition gave gold layers with high resistance. Other important parameters are substrate temperature and residual gas pressure. The substrate should be at room temperature or colder. Residual gas pressure should be in the $10^{-6}$ Torr range or lower. Importantly, the vacuum system has to be capable of operation substantially free of water vapor and organic contaminants. All of the deposition steps are carried out with the same apparatus without breaking vacuum.

Annealing after deposition has been previously reported to obtain substantial decreases in gold film resistivity. Some of the gold films deposited for this invention were annealed to see if similar results could be obtained. Annealing was done in air and film resistance continuously monitored. Slight decreases in resistivity of approximately 5% were found with annealing to 200°-230° C. At higher temperatures the films became discontinuous and such temperatures should not be used.

The primary function of the dielectric layers is to increase optical transmittance. They also influence the resistivity of the metal layer, protect the metal layer from attack by chemicals in the environment, and improve mechanical durability.

Loss of transmission in thin metal films is largely due to reflection by the impedance mismatch with adjacent media rather than to absorption. Much of the transmission can be recovered by use of dielectric matching layers on both sides of the metal film. Ideal matching will only occur at the design center wavelength of the dielectric layers. The degree to which the ideal design can be achieved is limited by the availability of compatible dielectric film materials with appropriate refractive index and low optical absorption. The desired 80% average transmittance may still be achieved because of the high value of maximum potential transmittance.

In order to simultaneously achieve invention goals of high transmittance and broad bandwidth in the infrared, dielectric layers with high index such as germanium, (a dielectric, in this context) are disclosed Dielectric layers adjacent to the metal layer can also affect the electrical properties of the metal. Some dielectrics, when deposited beneath the metal, can provide nucleation sites and reduce resistivity. Subsequent deposition of dielectric material on top of the metal can also cause changes of resistivity. Depending on the specific materials involved the result may be either an increase or decrease in resistivity. Some dielectric materials may be completely incompatible with the metal layer. This will be the case with dielectrics which combine chemically with or diffuse into the metal.

In order to prevent both detrimental and beneficial interactions at metal/dielectric interfaces the deposition of a layer of $Al_2O_3$ ($\sim 10$ nm) is employed as a diffusion barrier above and below the combined nucleating layer and metal layers. A high resistance was obtained with germanium as a nucleating layer which confirms the suspected incompatibility between this material and gold.

Following vapor deposition of the gold layer and barrier dielectric layer films, a multilayer anti-reflection coating is deposited. The design for 3-5 microns is given below and was deposited on a sapphire substrate. Four dielectric layers of Ge (n=4.1) and ZnS (n=2.3) were used for optical impedance matching of the gold layer to air. A single layer of Ge sufficed to match the gold layer to the sapphire substrate. The order in which the layers were deposited and their physical thicknesses are given as follows:

| Multilayer Evaporated Transparent Conductive Coating Design for 3-5 Microns | | | |
|---|---|---|---|
| Layer No. | Material | Thickness (nm) | |
| Substrate | Sapphire | As appropriate | |
| 1 | Ge | 214.6 | substrate-to-metal matching section |
| 2 | Al$_2$O$_3$ | 10.0 | diffusion barrier layer |
| 3 | Al | 0.5 | nucleating layer |
| 4 | Au | 10.0 | metal layer |
| 5 | Al$_2$O$_3$ | 10.0 | diffusion/barrier layer |
| 6 | Ge | 214.6 | dielectric anti-reflection impedance matching stack, metal-to-air |
| 7 | ZnS | 427.4 | |
| 8 | Ge | 243.9 | |
| 9 | ZnS | 393.2 | |
| Air | — | — | |

Referred to FIG. 1:

Layer numbered 1 is element 14, layer 2 is element 22; layer 3 is element 18; layer 4 is element 10; layer 5 is element 20; and layers 6-9 are element 12.

Table 1 shows the optical constants of the 10 nm gold film fabricated in accordance with the above specifications. For comparison the literature values of bulk gold optical constants are also shown. The measured electrical resistivity of this film is 2.9 ohms/sq. The data reported in Table 1 represents a factor of three improvement over the prior art in k/n value which controls the optical transmittance from the metallic film.

| WAVE-LENGTH of measurement | FILM PROPERTIES thin gold film | | LITERATURE DATA bulk values | |
|---|---|---|---|---|
| ($\mu$m) | n | k | n | k |
| 3.0 | 1.83 | 20.4 | 1.12 | 18.4 |
| 4.0 | 2.52 | 25.5 | 1.80 | 24.4 |
| 5.0 | 3.36 | 29.6 | 2.58 | 29.4 |

In the literature, the usual values for the n, k properties of thin film gold are a factor of 2-3 times those of the bulk values. As is seen, the difference between the bulk value and those of the film, window, and coating of the present invention are sufficiently close that the difference can now be ignored.

The materials usable in the present invention are restricted to those having high transparency over the designated bandwidth of operation.

For mid-infrared, the substrates can be selected from sapphire (Al$_2$O$_3$), ZnS, or ZnSe. The high index layers are preferably germanium; the low index ZnS or ThF$_4$. Ge has an index of 4.1 and is one of the few non-toxic high index materials available for deposition. The use of the high index dielectric adjacent the conductive metal layer allows matching with fewer layers and lower loss. Also, use of the high index (H) layer next to this metal yields greater window bandwidth. In general, the use of higher index (H) layer dielectric allows fewer layers to be required. The smaller number of layers are also not as sensitive to changes in the angle of incidence.

A nucleating layer is always used to achieve good metal film continuity in a very thin metal film layer. Barrier layers are needed to prevent diffusion of the metal film with adjacent dielectric layers. In general, the method of manufacture employs the steps of depositing a succession of layers of the coating by forming a first dielectric matching stack for impedance matching the metal layer to the substrate, depositing barrier and nucleating layers, depositing the metal layer on a cooled substrate, then another barrier layer, and finally an impedance matching stack to match the metal layer to air.

From the foregoing it can be seen that the general method of manufacture of this invention calls for deposition of the several layers in a vacuum chamber in which the vacuum is maintained unbroken through the entire series of steps and is free of organic contaminants and water vapor. The substrate temperature has to be controllable in order to cool the substrate to room temperature (25° C.) or below (5°-15° C.) for deposition of the metal layer.

Figure 3:
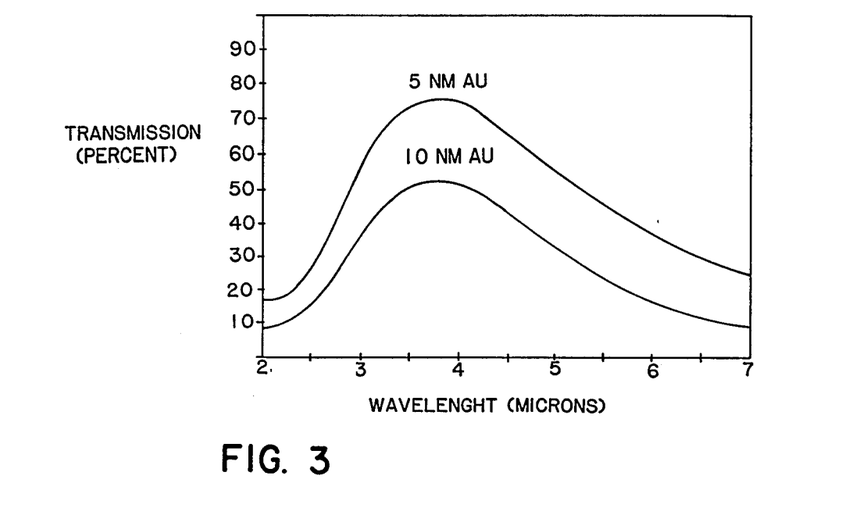
FIG. 3 is a graph showing the spectral transmission of an electrically conductive optically transparent coating designed for mid-infrared (3–5 μm) operation.
Figure 4:
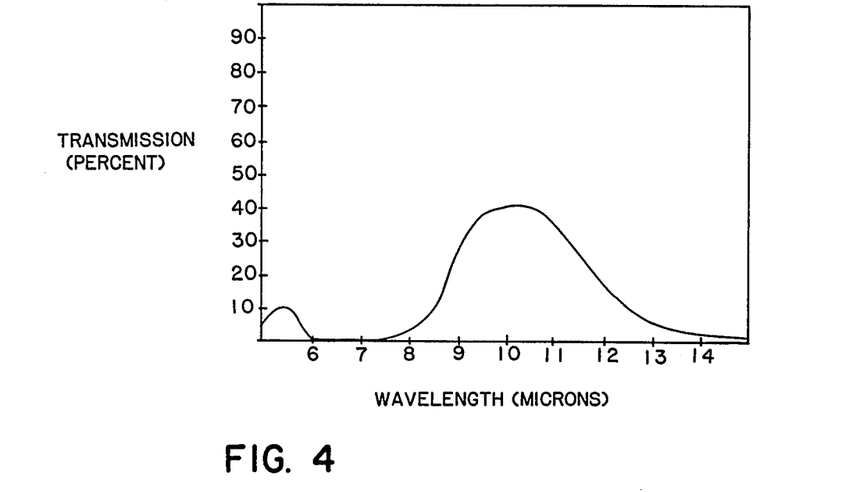
FIG. 4 is a graph showing the spectral transmission of an electrically conductive optically transparent coating designed for long infrared (8–12 μm) operation.
Figure 5:
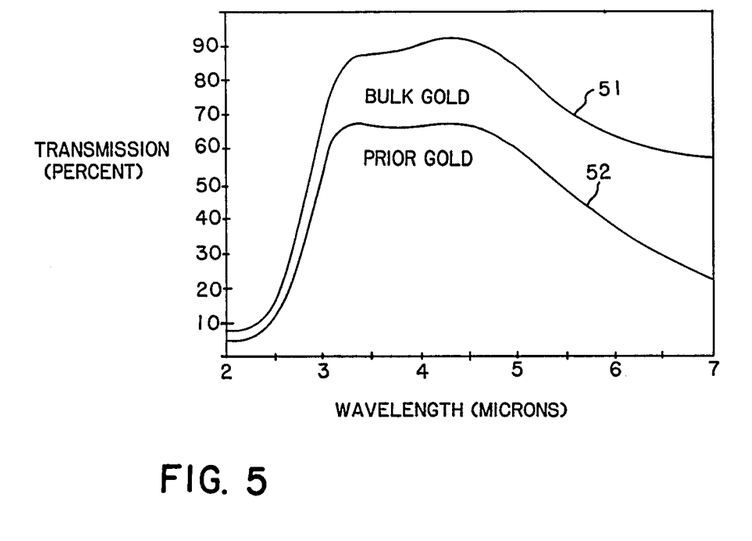
FIG. 5 is a graph showing the effect of optical constants of the ultrathin metallic layer on the transmittance of a mid-infrared electrically conductive optically transparent coating.

FIGS. 3-5 present a design study for infrared wavelength regions and normal incidence. The design depicted in FIG. 3 is based upon a gold metal film, germanium (high index), and thorium fluoride (low index) layer. The substrate material is sapphire. The optical constants used for the gold film were measured from film materials produced by prior techniques. The curve labeled 10 nm (100 A) gold is representative of a 5 ohms/sq. coating and reaches a peak transmission of 50%. The curve labeled 5 nm (50 A) gold has a peak transmission of 75%. This latter case corresponds to a sheet resistance of 20 ohms/sq. In contrast, the techniques outlined in this invention produce 10 nm thick gold films having approximately 3 ohms/square resistance resulting in significantly enhanced optical transmittance.

FIG. 4 shows the calculated spectral transmittance for a long-infrared transparent conductive coating based on a design for the 8-12 $\mu$m band. The metal layer was again gold and the dielectric layer materials consisted of germanium, zinc sulphide, and thorium flouride. The substrate material was germanium. The optical constants for the gold film were from measurments of films produced by prior techniques. The design shown in FIG. 4 has a peak transmission of 40% and a pass-bandwidth of 3 um. The free carrier absorption of the conductive gold layer becomes greater at longer wavelengths, so that improvement in the metal layer constants are needed for increased optical transmittance.

FIG. 5 shows the effect of the improved gold film properties on the optical performance of the mid-infrared transparent conductive coating design. The use of gold film properties shown at 51 result in peak optical transmittances in excess of 85%. The curve 52 was computed from measurements of properties of gold films produced by prior techniques and shows a peak transmission of 65% and reduced optical bandwidth. The need for the improved gold film properties provided by the present invention is evident.

Figure 6:
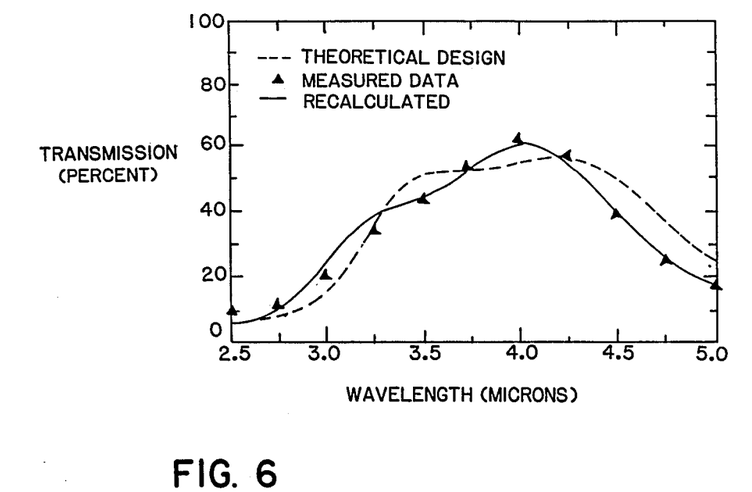
FIG. 6 is a graph showing the measured optical transmittance data for a mid-infrared (see FIG. 3) electrically conductive optically transparent coating. The graph also includes the corresponding analytical design and shows good agreement between the design and measurement.
Figure 7:
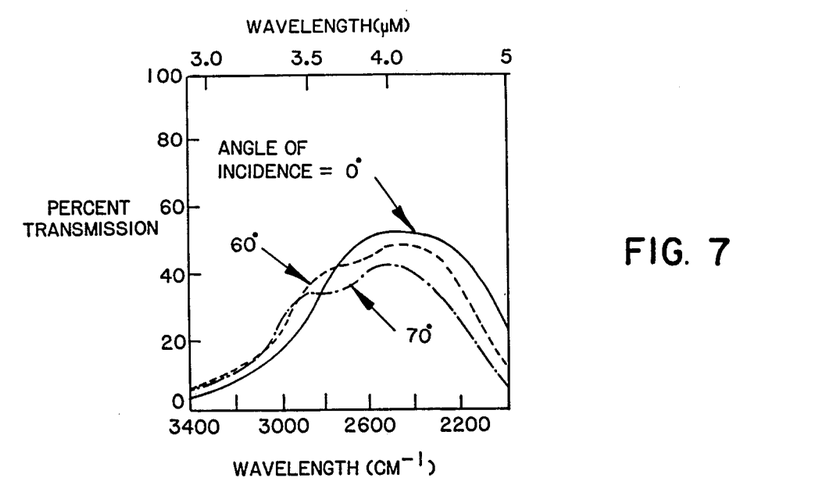
FIG. 7 is a graph of the spectral transmission of an experimental infrared transparent conductive window for differing angles of incident radiation.

FIG. 6 shows the measured spectral transmittance of a wide pass-bandwidth mid-infrared transparent conductive coating. The transmittance is for normally incident light. The coating was designed for a wide angle of incidence; therefore, some transmittance was sacrificed for the normal incidence case. Also shown in FIG. 7 are the theoretical design and recalculated design. The recalculated design took into account the actual (as deposited) thicknesses of the dielectric films and shows good agreement between the theoretical design and measured data.

The optical performance obtained for a 7 ohm/square coating on a sapphire substrate is shown in FIG. 7. Transmission is above 50% between 3.7 and 4.4 microns at normal incidence. At 70 degrees angle of incidence the transmission is over 30% from 3.4 to 4.5 microns. Although this sample was deposited on a sapphire substrate, the same basic design can be implemented on other materials such as ZnS. Model calculation of optical performance for these coatings has been in excellent agreement with measured performance of coated samples. The conductive layer was 10 nm of gold. Measured optical constants of this highly conductive gold at 5 microns are $n=3.36$ and $k=20.6$. These values compare favorably with those of bulk gold.

The UV Example

The present invention has been applied to making a window and coating for use in the ultraviolet spectral region.

In general, the procedure closely follows that already as discussed in connection with the previous example given for the infrared and as shown generally in FIGS. 1 and 2.

The substrate chosen is silicon dioxide ($SiO_2$). nucleating and barrier layer functions are achieved with yttrium oxide ($Y_2O_3$) which is also used as a high index layer in adjacent impedance match stacks of alternate layers of $Y_2O_3$ and $SiO_2$. The metal conductive layer is aluminu-m metal (Al).

The deposition process is again vapor deposition using an electron beam source for vaporizing the materials. A graphite insert was used to contain the aluminum during vaporization.

| Layer No. | Material | UV WINDOW Thickness (nm) | |
|---|---|---|---|
| Substrate | $SiO_2$ | Massive | |
| 1 | $Y_2O_3$ | 388 | |
| 2 | $SiO_2$ | 491 | 1st dielectric stack matching section |
| 3 | $Y_2O_3$ | 273 | also nucleating and barrier layer |
| 4 | Al | 11.4 | metal conductive layer |
| 5 | $Y_2O_3$ | 260 | also the barrier layer |
| 6 | $SiO_2$ | 498 | 2d dielectric stack matching section |
| 7 | $Y_2O_3$ | 325 | |
| 8 | $SiO_2$ | 594 | |
| 9 | $Y_2O_3$ | 497 | |
| 10 | $SiO_2$ Air | 458 | |

Referred to FIG. 1: layers 1-3 are element 14; layer 3 is also elements 18 and 22; layer 4 is element 10; layers 5-10 are element 12; and layer 5 is also element 20.

The first dielectric stack is laid down at a temperature of 150° C. with a $5\times10^{-5}$ Torr $O_2$ gas back pressure and at a deposition rate of 2A/sec.

The partially coated substrate is then cooled to 25° C., and the aluminum layer deposited without any $O_2$ bleed at $1.5\times10^{-6}$ Torr and a deposition rate of 5A/sec. The fifth ($Y_2O_3$) layer is then deposited at 25° C. without $O_2$ bleed at a rate of 2 A/sec.

The partially coated substrate is then raised to 150° C. and the remainder of the second dielectric stack laid down with a $5\times10^{-5}$ Torr 0 back pressure and at a rate of 2A/sec. $10^{-5}$ Torr $O_2$ back pressure and at a rate of 2A/sec.

Figure 8:
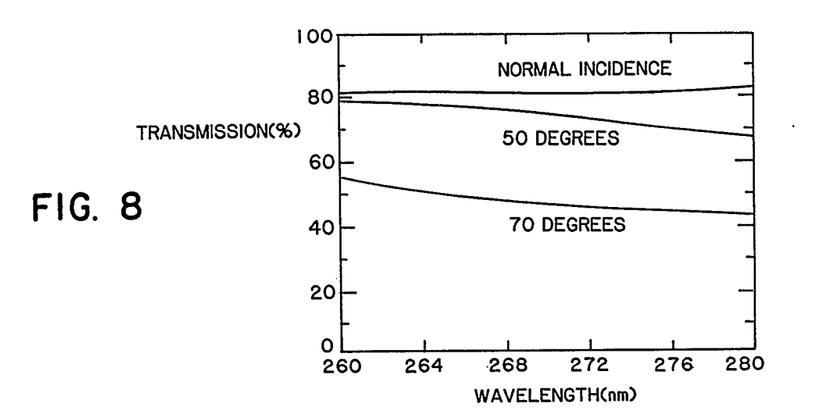
FIG. 8 is a graph showing the spectral transmission of an electrically conductive optically transparent coating designed for ultraviolet wavelength operation.

FIG. 8 depicts the calculated spectral transmittance of a ultaviolet transparent conductive film at three angles of incidence: normal, 60°, and 70°. Conventional optical coating materials (silicon dioxide and yttrium oxide) were used as dielectric layers. The metallic layer was silver and the substrate material was fused silica. Al metal could be used as a nucleating layer. The normal incidence peak transmittance for this design is in excess of 80%.

Figure 9:
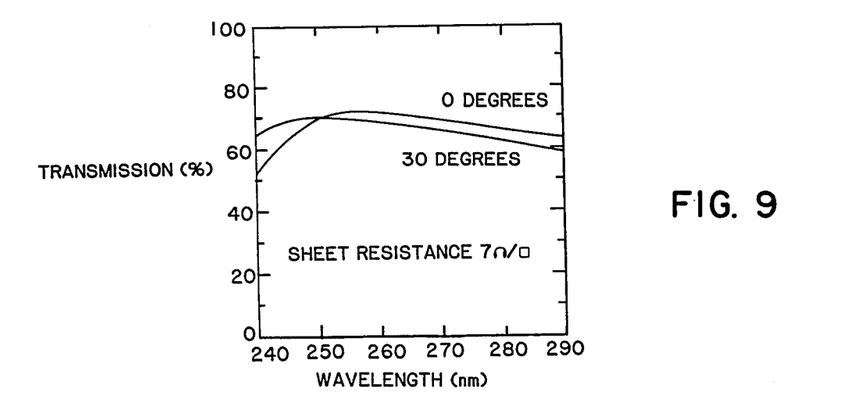
FIG. 9 shows a graph of measured spectral transmittance for an ultraviolet transparent conductive coating using an aluminum metallic layer. This design was optimized for angles of incidence ranging from 70° to normal.

FIG. 9 shows a graph of measured spectral transmittance for an ultraviolet transparent conductive coating using an aluminum metal layer. This design was optimized for angles of incidence ranging from 70° to normal.

The materials usable in the ultraviolet are quite restricted. For the high index dielectric $Y_2O_3$, $HfO_2$, and $Al_2O_3$ are available. For the low index dielectric $SiO_2$ and $MgF_2$ are available. $Y_2O_3$ is a particularly useful choice as it also serves as a diffusion barrier and nucleating layer for the aluminum metal conductive layer.

In summary, a technique is described for the attainment of low electrical sheet resistances, high optical transmittance together with large pass-bandwidths. The critical elements of the present invention are the metallic, nucleating, and barrier coatings and their use in an induced transmission configuration. The importance of nucleating and barrier layers cannot be overemphasized because it is this feature that provides the high optical transmittance. The present invention is applicable to any wavelength band. The extension to other operational wavelengths requires only the use of appropriate metallic and dielectric films.

While the invention has been described in preferred embodiments with infrared and UV, it is clear that the presentation given is descriptive in nature and does not constitute a limitation of the invention to other wavelengths or other materials.

When the teachings of the present invention are employed it has now been possible to achieve designs for conductive windows and coatings useful in the infrared and ultraviolet with the following properties.

(a) An electrically conductive optically transparent coating incorporating nucleation and barrier coatings adjacent to the metallic layer and providing uniform metallic layer properties which are substantially the same as the properties of the same metal in its bulk form.

(b) An electrically conductive optically transparent coating having low electrical sheet resistance (<10 ohms/sq) and high optical transmittance (>50%) which can be tailored to provide high transmittance, infrared, large pass-bandwidth (>1 $\mu$m), or large angle of incidence (70°) capability.

(c) An electrically conductive optically transparent long-infrared coating having large pass-bandwidth (>3 μm), large transmission (>40%), and low electrical sheet resistance (<10 ohms/sq.)

(d) An electrically conductive optically transparent ultraviolet coating having large transmission (>50%) and low sheet resistivity (<10 ohms/sq.)

What is claimed is:

1. An electrically conductive window having high optical transparency in the infrared, visible, or UV bands comprising
   a substrate having at lease one smooth contiuous surface on one side thereof,
   an intermediate dielectric impedance matching stack dsposited on said substrate surface,
   a first difusion barrier layer deposited on said intermediate matching stack,
   a nucleating layer deposited on said first barrier layer,
   a conductive metal layer deposited on said nucleating layer in a film of continuous uniform thickness of about 10 nm or lesss with optical constants n, k,
   said nucleating layer being selected to cooparate with said metal layer to allow the metal layer to form in a continuous thin film without agglomeration having optical constants n, k approximating these of the bulk metal and with a low sheet resistance,
   said intermediate stack forming an impedance match between said substrate and said conductive layer,
   a second diffusion barrier layer deposited on said metal layer, and
   an outer dieletric anti-reflection stack deposited on said second barrier layer to form an impedance match between said conductive layer and air.

2. The window as in claim 1 in which said layer of conductive metal is selected from the group consisting of Au, Al, and Ag.

3. The window as in claim 1 in which said layer of conductive metal is gold and said nucleating layer is Al metal or oxygen deficient oxide aluminum.

4. The window as in claim 1 selected for operation in the infrared in which said layer of metal is gold, and said nucleating layer is Al metal or highly oxygen deficient aluminum oxide.

5. The window as in claim 4 in which the diffusion barrier is $Al_2O_3$.

6. The window as in claim 4 in which said impedance matching stacks are made of layers of high index transparent materials.

7. The window as in claim 6 in which said materials are selected from the group consisting of and ZnS.

8. The window as in claim 6 in which said substrate is sapphire

9. The window as in claim 1 in which said conductive metal is aluminum and said nucleating layer is yttrium oxide.

10. The window as in claim 1 selected for operation in the ultraviolet in which said conductive metal layer is aluminum and said nucleating layer is $Y_2O_3$.

11. The window as in claim 10 in which said impedance matching stacks are made of dielectric materials selected from the group consisting of yttrium oxide ($Y_2O_3$) and silicon dioxide ($SiO_2$).

12. The window as in claim 1 in which said outer anti-reflection stack is constructed and arranged to cause the electric field of the electromagnetic waves at the band of transparency to have a minimum value in the metal layer.

13. An electrically conductive window having optical transparency in the infrared, visible, or UV bands comprising
   a substrate transparent at said band and having a surface on one side thereof,
   means for impedance matching energy of said band to said substrate,
   means forming a first diffusion barrier at the surface of said last named means,
   means forming a nucleating surface on said barrier,
   a layer of substantially transparent conductive metal deposited on said nucleating means to a thickness yielding a resistance value of less than about 10 ohms/sq.,
   said nucleating means being selected to cooperate with said metal layer to allow the metal layer to form in a continuous thin film without agglomeration having optical constants n, k approximating these of the bulk metal,
   said first matching means forming an impedance match between said substrate and said conductive layer,
   means forming a second diffusion barrier on said metal layaer, and
   means on said second barrier to form a impedance match between the underlying means and layer, and air.

14. The window as in claim 13 in which said conductive metal is selected from the group consisting of Au, Al, and Ag.

15. The window as in claim 13 in which said conductive metal is gold and said nucleating layer is Al metal or oxygen deficient oxide aluminum.

16. The window as in claim 13 selected for operation in the infrared in which said conductive metal is gold, and said nucleating surface is made of Al metal or oxygen deficient aluminum oxide.

17. The window as in claim 16 in which the diffusion barriers are $Al_2O_3$.

18. The window as in claim 16 in which said impedance matching means are made of layers of high index transparent materials.

19. The window as in claim 18 in which said materials are selected from the group consisting of Ge and ZnS.

20. The window as in claim 18 in which said substratae is sapphire.

21. The window as in claim 13 in which said conductive metal is aluminum and said nucleating means is yttrium oxide.

22. The window as in claim 13 selected for operation in the ultraviolet in which said conductive metal is aluminum and said nucleating means is $Y_2O_3$.

23. The window as in claim 22 in which said impedance matching means are made of dielectric materials selected from the group consisting of yttrium oxide ($Y_2O_3$) and silicon dioxide ($SiO_2$).

24. The window as in claim 13 in which said several means and metal layer are constructed and arranged to cause the electric field of the electromagnetic waves at the band of transparency to have a minimum value in the conductive metal layer.

25. A transparent, conductive window comprising
   a substrate having an outer surface,
   first means formed at said surface for matching the impedance of the substrate to overlaid material subsequently deposited or created, second means formed at the outer surface of said first means for creating a barrier against diffusion of overlaid material therethrough, third means formed at the outer surface of said second means for causing nucleation of overlaid material fourth substantially transparent means deposited on siad third means for forming a conductive metal layer at the surface thereof having a surface conductivity of less than 10 ohms/sq.

fifth means formed on said fourth means for creating a barrier against upward outward migration of said fourth means, and sixth means formed on said fifth means for matching the impedance of the previous means to air.

26. The window as in claim 25 in which the fourth means is made of gold.

27. The window as in claim 25 in which the second and fifth means are made of $Al_2O_3$.

28. The window as in claim 25 in which the fourth means is made of gold and in which the third means is made of Al.

29. The window as in claim 25 in which said several means are constructed and arranged to cause the electric field of the electromagnetic waves at the predetermined frequency to have a minimum value in the fourth means.

* * * * *